US008579635B2

(12) United States Patent
Musk et al.

(10) Patent No.: US 8,579,635 B2
(45) Date of Patent: Nov. 12, 2013

(54) FUNNEL SHAPED CHARGE INLET

(75) Inventors: Elon Reeve Musk, Los Angeles, CA (US); Joshua Willard Ferguson, Alameda, CA (US); Daryl Zalan, San Francisco, CA (US); Christopher Hugo Van Dyke, San Francisco, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 13/549,185

(22) Filed: Jul. 13, 2012

(65) Prior Publication Data
US 2013/0078839 A1 Mar. 28, 2013

Related U.S. Application Data

(63) Continuation-in-part of application No. 13/482,900, filed on May 29, 2012, and a continuation-in-part of application No. 13/489,617, filed on Jun. 6, 2012, and a continuation-in-part of application No. 29/427,056, filed on Jul. 13, 2012, and a continuation-in-part of application No. 29/427,078, filed on Jul. 13, 2012.

(60) Provisional application No. 61/540,303, filed on Sep. 28, 2011, provisional application No. 61/540,441, filed on Sep. 28, 2011, provisional application No. 61/540,549, filed on Sep. 29, 2011, provisional application No. 61/540,550, filed on Sep. 29, 2011, provisional application No. 61/654,779, filed on Jun. 1, 2012.

(51) Int. Cl.
H01R 12/00 (2006.01)
(52) U.S. Cl.
USPC .............. 439/34; 439/135; 439/528

(58) Field of Classification Search
USPC ............ 439/677, 34, 528, 135, 345; 320/109, 320/107, 108, 111, 162
See application file for complete search history.

(56) References Cited

U.S. PATENT DOCUMENTS

| 5,556,284 | A | * | 9/1996 | Itou et al. ........................ 439/34 |
| 5,577,920 | A | * | 11/1996 | Itou et al. ........................ 439/34 |
| 5,637,977 | A | * | 6/1997 | Saito et al. ..................... 320/109 |
| 6,458,000 | B2 | * | 10/2002 | Shappell ........................ 439/677 |
| 6,745,911 | B1 | * | 6/2004 | Maestranzi ................. 213/75 R |
| 7,390,222 | B2 | * | 6/2008 | Ciancanelli et al. .......... 439/617 |
| 7,988,453 | B2 | * | 8/2011 | Loo et al. ........................ 439/34 |
| 8,025,526 | B1 | * | 9/2011 | Tormey et al. ................ 439/528 |
| 8,460,028 | B2 | * | 6/2013 | Tormey et al. ................ 439/528 |
| 2011/0151693 | A1 | * | 6/2011 | Loo et al. ...................... 439/135 |
| 2013/0076059 | A1 | * | 3/2013 | Zalan et al. ................. 296/97.22 |
| 2013/0078839 | A1 | * | 3/2013 | Musk et al. ................... 439/345 |
| 2013/0078841 | A1 | * | 3/2013 | Ferguson et al. ............. 439/350 |

* cited by examiner

Primary Examiner — James Harvey
(74) Attorney, Agent, or Firm — J. Richard Soderberg

(57) ABSTRACT

A vehicle charge inlet integrated into a port assembly surface is provided. The charge inlet includes an inlet housing with a perimeter that is curvilinear, non-cylindrical and shaped so that only a single orientation of a complementary sized and shaped electrical connector may be inserted into the inlet. A plurality of electrical contacts, a latching mechanism and a divider are also integrated into the charge inlet housing, the divider extending from the bottom surface of the inlet housing and configured to fit within a complementary slot of the charge connector, the divider providing further electrical isolation between the electrical contacts. A funneling surface connects the open end of the inlet housing to the port assembly surface.

19 Claims, 7 Drawing Sheets

FUNNEL SHAPED CHARGE INLET

CROSS-REFERENCE TO RELATED APPLICATION

This application claims the benefit of the filing date of U.S. Provisional Patent Application Ser. Nos. 61/540,303, filed 28 Sep. 2011, 61/540,441, filed 28 Sep. 2011, 61/540,549, filed 29 Sep. 2011, 61/540,550, filed 29 Sep. 2011, and 61/654,779, filed 1 Jun. 2012, the disclosures of which are incorporated herein by reference for any and all purposes. This application is a continuation-in-part of U.S. patent application Ser. Nos. 13/482,900, filed 29 May 2012, 13/489,617, filed 6 Jun. 2012, 29/427,056, filed 13 Jul. 2012, and 29/427,078, filed 13 Jul. 2012, the disclosures of which are incorporated herein by reference for any and all purposes

FIELD OF THE INVENTION

The present invention relates generally to vehicles and, more particularly, to the charge port of an electric vehicle.

BACKGROUND OF THE INVENTION

The charge port for plug-in hybrids (PHEVs) and all-electric vehicles (EVs) is typically externally mounted, thereby allowing easy access and the ability to lock the passenger compartment while the vehicle is being charged. A charge port door, similar to the fuel filler door on a conventional vehicle, is used to protect the charge port from the weather as well as possible tampering.

In general, the physical, electrical and performance requirements as well as the communication protocols used in the conductive charge coupler employed by both PHEVs and EVs in the U.S. follow the recommended practices as provided by the SAE J1772 standard. This standard requires that the charge connector and the vehicle inlet to which the connector is coupled during charging include five contacts. These contacts include a pair of AC power lines, an equipment ground/chassis ground, a control pilot conductor and a proximity sense conductor. The control pilot conductor is the communication link between the vehicle and the charging system that insures that prior to initiating charging, the vehicle is connected, the source is ready to supply charging energy, and the vehicle is ready to accept charging energy. This communication link is also used to determine ventilation requirements, current battery capacity, and to control energy flow throughout the process while monitoring the ground connection. The proximity sense conductor allows the vehicle to detect the presence of the charge connector so that vehicle movement may be prevented when the car is coupled to the charge system.

A variety of charge connector and inlet geometries are currently in use that not only provide the necessary interface connections, but also meet the power delivery, electromagnetic emission, temperature, safety, environmental sealing, ergonomic and latching requirements set by SAE J1772. In general these coupling systems are large and awkward to use, often employing a large cylindrical connector that houses the contact pins and fits within a similarly sized cylindrical inlet. Additionally, a key or similar lead-in feature insures proper orientation of the cylindrical connector into the inlet while a latching mechanism holds the connector in place during charging. While such a connector is functionally adequate, it is cumbersome and difficult to align with the charge inlet, especially under less than ideal conditions such as darkness or inclement weather. Accordingly, what is needed is a charge inlet that simplifies connector alignment. The present invention provides such a charge inlet.

SUMMARY OF THE INVENTION

The present invention provides a vehicle charge inlet integrated into a port assembly surface. The charge inlet is comprised of a plurality of electrical contacts configured to be electrically coupled to a second plurality of electrical contacts integrated into a charge connector, where the plurality of electrical contacts include first and second power contacts, a ground contact, a pilot contact and a proximity sense contact. The charge inlet is further comprised of an inlet housing having an inlet surface, a first end and a second end, where the first end is closed by a bottom surface into which the plurality of electrical contacts are integrated; where the perimeter of the inlet surface is curvilinear and non-cylindrical; where a second perimeter corresponding to the charge connector is complementary to the perimeter of the inlet surface and sized to allow insertion of the charge connector into the inlet housing; and where the perimeter of the inlet surface and the second perimeter corresponding to the charge connector permit only a single orientation of the charge connector during insertion of the charge connector into the charge inlet, where the single orientation aligns the charge connector to the charge inlet and aligns the plurality of electrical contacts to the second plurality of electrical contacts. The charge inlet is further comprised of a divider extending from the bottom surface and configured to fit within a complementary slot of the charge connector, where the divider is fabricated from an electrically insulating material and is separate from the plurality of electrical contacts. The divider may utilize a three pointed star shape, for example where a first portion extends between the first and second power contacts, where a second portion extends between the first power contact and the pilot contact, and where a third portion extends between the second power contact and the proximity sense contact. The charge inlet is further comprised of a latching mechanism integrated into the inlet housing, the latching mechanism including a pawl configured to pass through the inlet surface and fit within a slot in the charge connector when the charge connector is inserted into the charge inlet during vehicle charging.

In at least one embodiment, all curvatures comprising the perimeter of the inlet surface have a radius of curvature at least 2 millimeters, and more preferably at least 6 millimeters.

In at least one embodiment, the shape of the perimeter of the inlet surface approximates a trapezoidal shape.

In at least one embodiment, the inlet surface of the inlet housing is continuous and does not incorporate an alignment key or key slot.

In at least one embodiment, the charge inlet is further comprised of a funneling surface that connects the open end of the inlet housing to the port assembly surface, where the funneling surface extends the curvilinear and non-cylindrical shape of the perimeter of the inlet surface to the port assembly surface. The width of the funneling surface may be within the range of 2 to 30 millimeters. The depth of the funneling surface may be within the range of 2 to 30 millimeters. The cross-section of the funneling surface may maintain a constant curvilinear shape around the perimeter of the inlet surface. The radius of curvature of the funneling surface may be constant between the open end of the inlet housing and the port assembly surface. The cross-section of the funneling surface may be curvilinear with all curvature being greater than 2 millimeters in radius. The curvature corresponding to the cross-section of the funneling surface at the juncture of the funneling surface and the port assembly surface may be between 2 and 30 millimeters in radius, or between 4 and 15 millimeters in radius. The shape of the funneling surface may approximate a trapezoidal shape.

In at least one embodiment, the charge inlet is further comprised of a funneling surface that connects the open end of the inlet housing to the port assembly surface, where the funneling surface extends the curvilinear and non-cylindrical shape of the perimeter of the inlet surface to the port assembly surface, and where a plurality of lights (e.g., LEDs) are mounted beneath the funneling surface. Preferably the lights are not visible under the funneling surface when they are off, where the output light generated by the lights is visible through the funneling surface. The lights may be used to provide charge status information.

A further understanding of the nature and advantages of the present invention may be realized by reference to the remaining portions of the specification and the drawings.

DESCRIPTION OF THE SPECIFIC EMBODIMENTS

Figure 1:
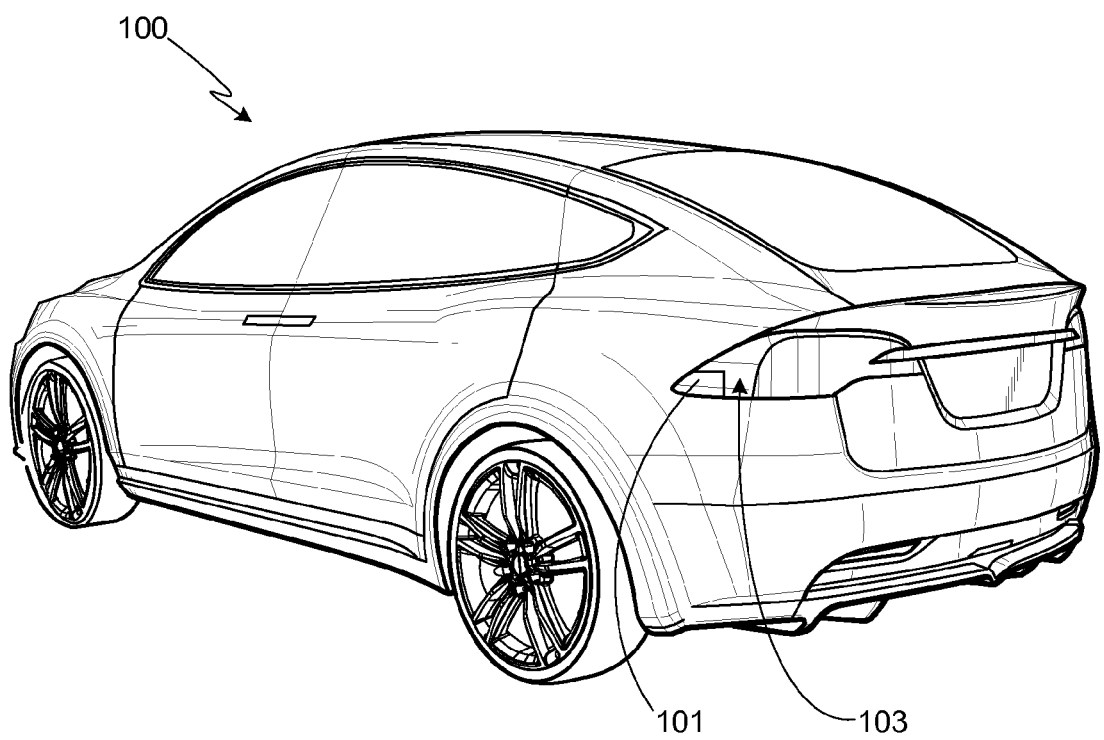
FIG. 1 illustrates a charge port integrated into the lamp assembly of an electric vehicle.
Figure 2:
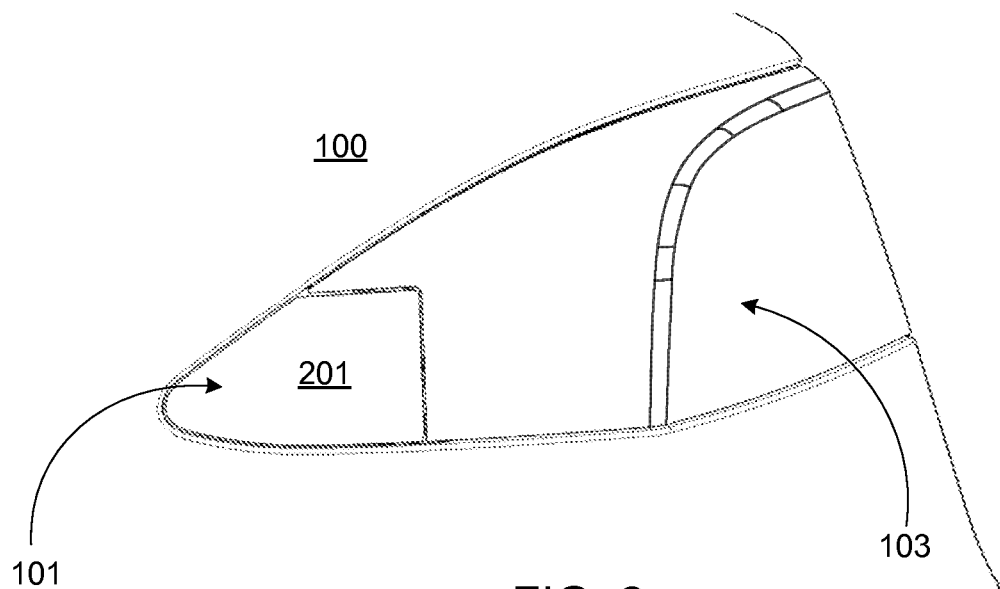
FIG. 2 provides an external side view of the lamp assembly of the vehicle shown in FIG. 1 with the charge port access door closed.
Figure 3:
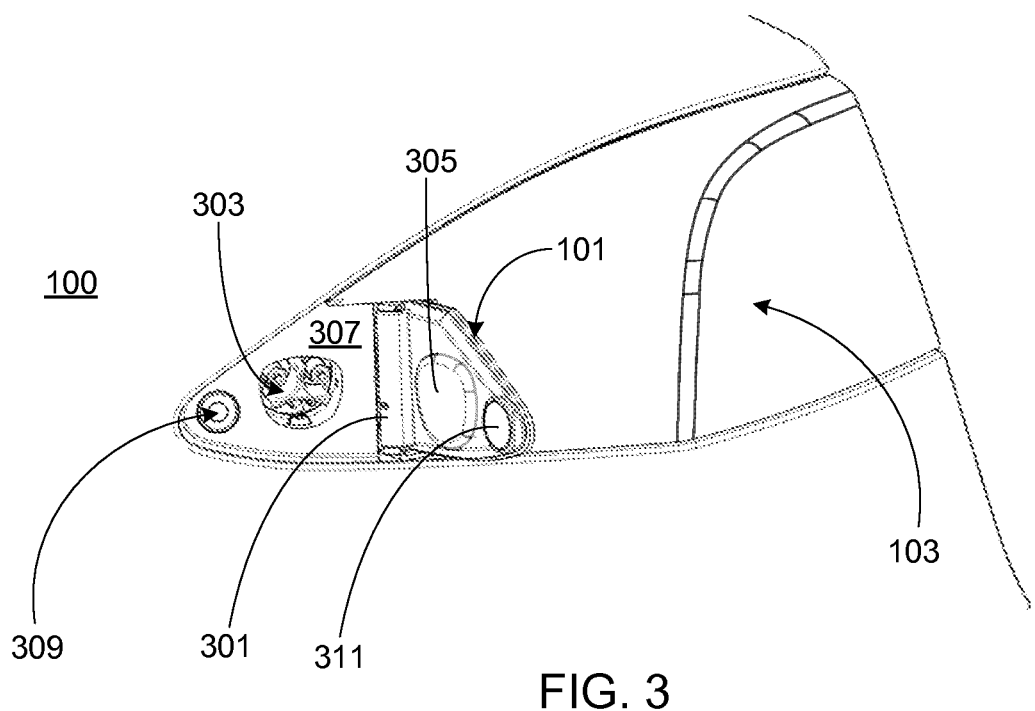
FIG. 3 provides an external side view of the lamp assembly of the vehicle shown in FIG. 1 with the charge port access door open.

FIGS. 1-3 illustrate a charge port door 101 integrated within the rear vehicle lamp and reflector assembly 103 of a vehicle 100. It should be understood, however, that the present invention is not limited to such a configuration and that a charge inlet in accordance with the invention may be mounted at another vehicle location, such as the front or rear fender panel, or another vehicle body member.

FIGS. 2 and 3 provide external side views of the lamp assembly 103 of vehicle 100 and charge port door 101 with the door closed and opened, respectively. In this exemplary configuration, the exterior surface of charge port door 101 is covered with a reflector 201, thus allowing the charge port door to blend into the lamp and reflector assembly 103. Door 101 is preferably spring loaded, thus causing the door to at least partially open about hinge axis 301 when the latching mechanism is released. With door 101 open, charge inlet 303 is visible as is port seal 305. Inlet 303 is recessed within surface 307 of the port assembly. In this exemplary embodiment, a portion 309 of an electromagnetic latching mechanism is located within the charge port assembly integrated into the vehicle while a secondary portion 311 of the latching mechanism is located on the complementary surface of door 101. A suitable electromagnetic latching mechanism is described in detail in co-pending and co-assigned U.S. patent application Ser. No. 13/482,900, filed 29 May 2012, the disclosure of which is incorporated herein for any and all purposes. It should be understood, however, that the charge inlet of the present invention is not limited to use with a charge port and door latching assembly of any particular configuration. For example, the door covering the inlet may be configured as a spring loaded door with a simple door handle or finger hold, a push-push latch, a solenoid latching assembly, a spring loaded latch operated using a cable, or any other latching assembly.

Figure 4:
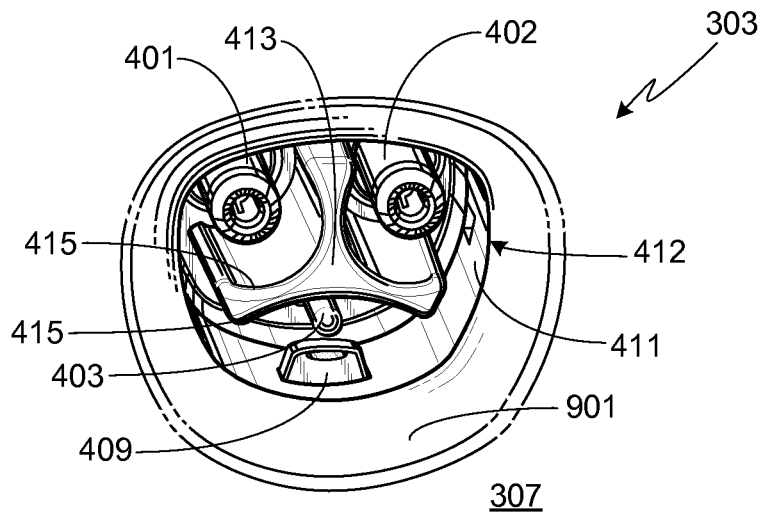
FIG. 4 provides a perspective view of a charge inlet in accordance with the invention.
Figure 5:
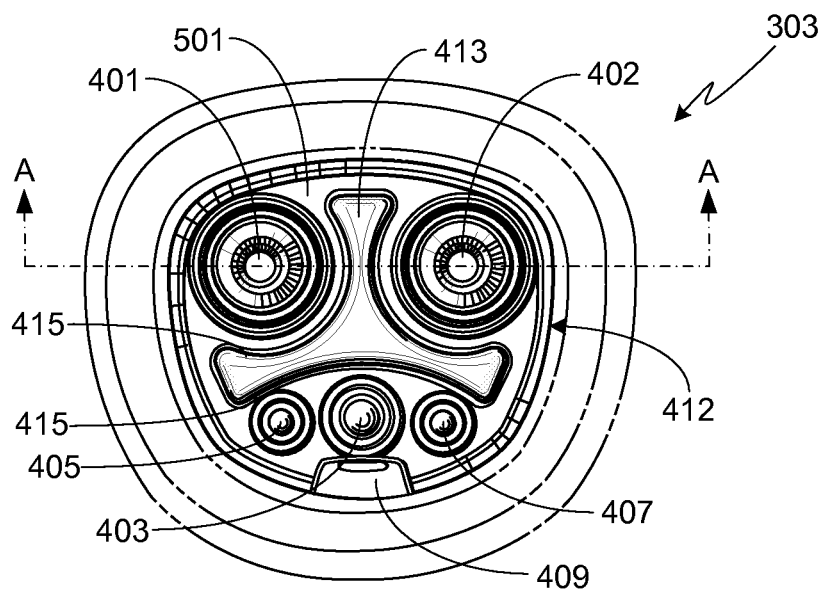
FIG. 5 provides an outer view of the charge inlet shown in FIG. 4.
Figure 6:
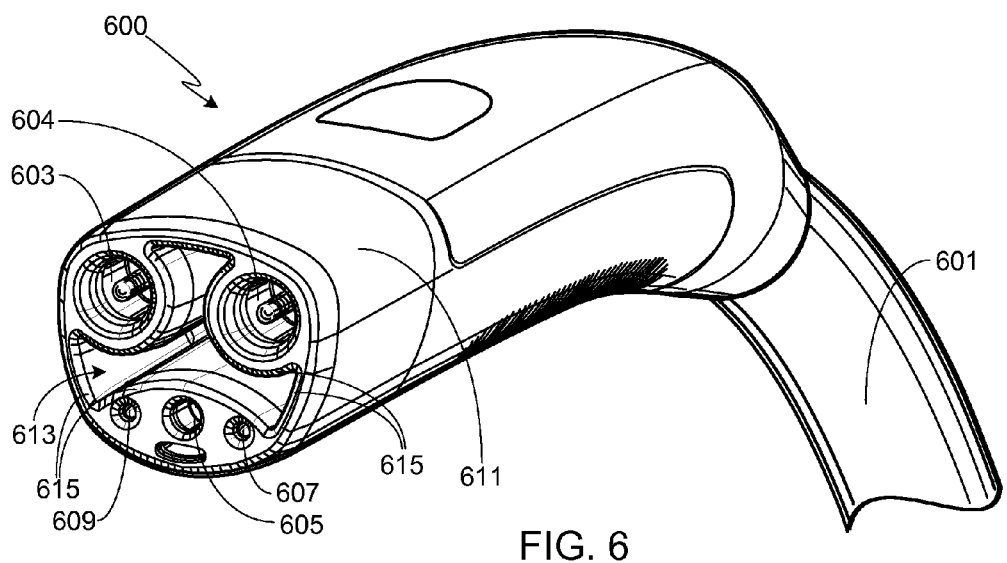
FIG. 6 provides a perspective view of a charge connector for use with the funneled inlet shown in FIGS. 4 and 5.
Figure 7:
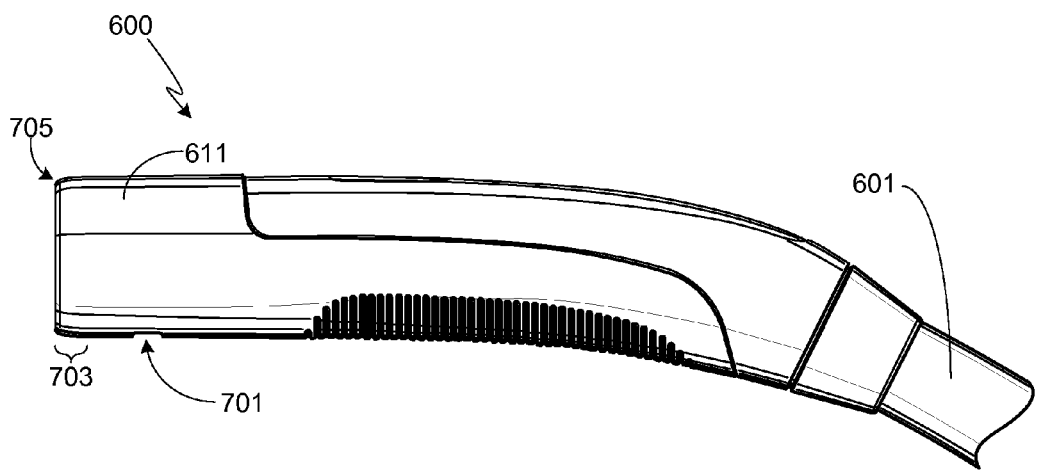
FIG. 7 provides a side view of the charge connector shown in FIG. 6.
Figure 8:
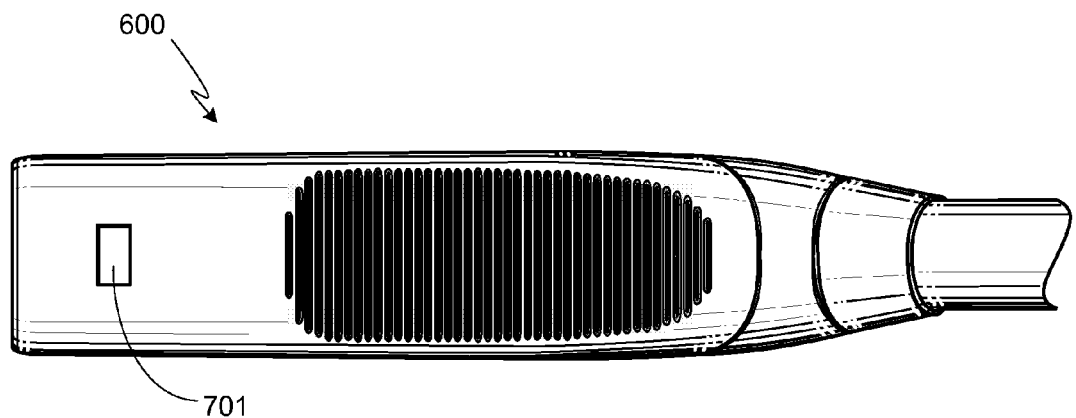
FIG. 8 provides a bottom view of the charge connector shown in FIGS. 6 and 7.

FIGS. 4 and 5 provide multiple views of charge inlet 303, also referred to herein as a charge port. Charge inlet 303 is coupled to the charging system, not shown, of vehicle 100. FIGS. 6-8 provide perspective, side and bottom views, respectively, for a connector 600 suitable for use with charge inlet 303, connector 600 coupled to a charging source, not shown, via cable 601. Charge inlet 303 includes power contacts 401 and 402, ground contact 403, control pilot contact 405 and proximity sense contact 407. Connector 600 includes complementary power contacts 603 and 604, ground contact 605, control pilot contact 607 and proximity sense contact 609. Also visible in FIGS. 4 and 5 is a retractable latching pawl 409 designed to engage within a connector aperture 701 once connector 600 is fully inserted within inlet 303, thereby holding connector 600 in place. Although pin and socket type contacts are shown, other contact types may be used with the invention such as blade terminals, rod terminals, and terminal pads.

In accordance with the invention, charge inlet 303 is shaped and configured to simplify connector alignment during the coupling process. As illustrated in FIG. 5, the perimeter 412 of inlet inner surface 411 taken along a plane orthogonal to surface 411 has a continuous curvilinear shape that is mirrored in the complementary surface 611 of connector 600. Perimeter 412, and complementary surface 611, are non-cylindrical and shaped so that there is a single orientation that allows connector 600 to be inserted into inlet 303.

Figure 9:
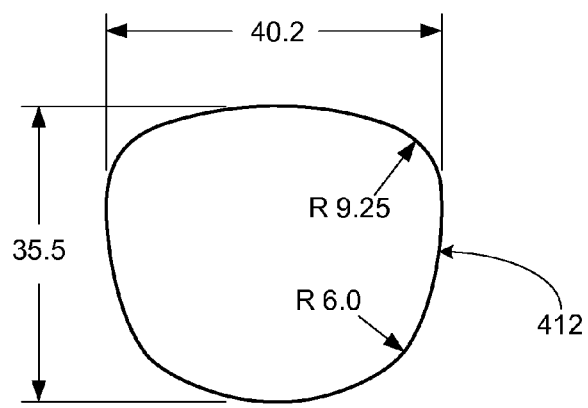
FIG. 9 provides dimensions and surface radii of the charge inlet shown in FIGS. 4 and 5.

FIG. 9 provides the approximate dimensions and surface radii of a preferred embodiment of the inlet, and in particular the perimeter 412 of inlet surface 411. Preferably and as illustrated, the perimeter 412 of inlet surface 411 has no corners or curvilinear surfaces with radii less than 2 millimeters, and more preferably no corners or curvilinear surfaces with radii less than 6 millimeters. By eliminating sharp corners, connector 600 may be easily rotated about its insertion axis during the coupling process. Thus the user is able to apply a small force to connector 600 which rotates it about its insertion axis until the unique shapes of the inlet and connector are co-aligned, thus allowing the two components to be joined together.

In a conventional charge coupler, rather than maintaining all contacts and charge coupler related hardware within the perimeter of a single housing, typically one or more coupler related features extend away from the housing wall or are contained within a separate housing altogether. For example, one wall of a conventional charge inlet housing may include a key slot, also commonly referred to as a keyway, which is designed to accommodate a key extending away from the connector, thus helping to properly align the connector during coupling. Some conventional charge couplers also utilize multiple housings, thus allowing the power pins to be separated from the other pins, e.g., ground, proximity and pilot control pins. Still other conventional charge couplers separate the latching mechanism from the charge inlet housing in which the charge contacts are located.

In contrast to a conventional charge inlet, all charge coupler related features are located within the interior of the single inlet housing as defined by surface 411. As a result of this configuration, the overall footprint of the charge inlet and the charge connector are quite small relative to a conventional charge coupler. More importantly, by containing all features within the interior volume of a single inlet housing, the outer surface 611 of the charge connector 600 is preferably smooth as shown, thus allowing the connector to easily rotate into alignment during the insertion procedure.

Figure 10:
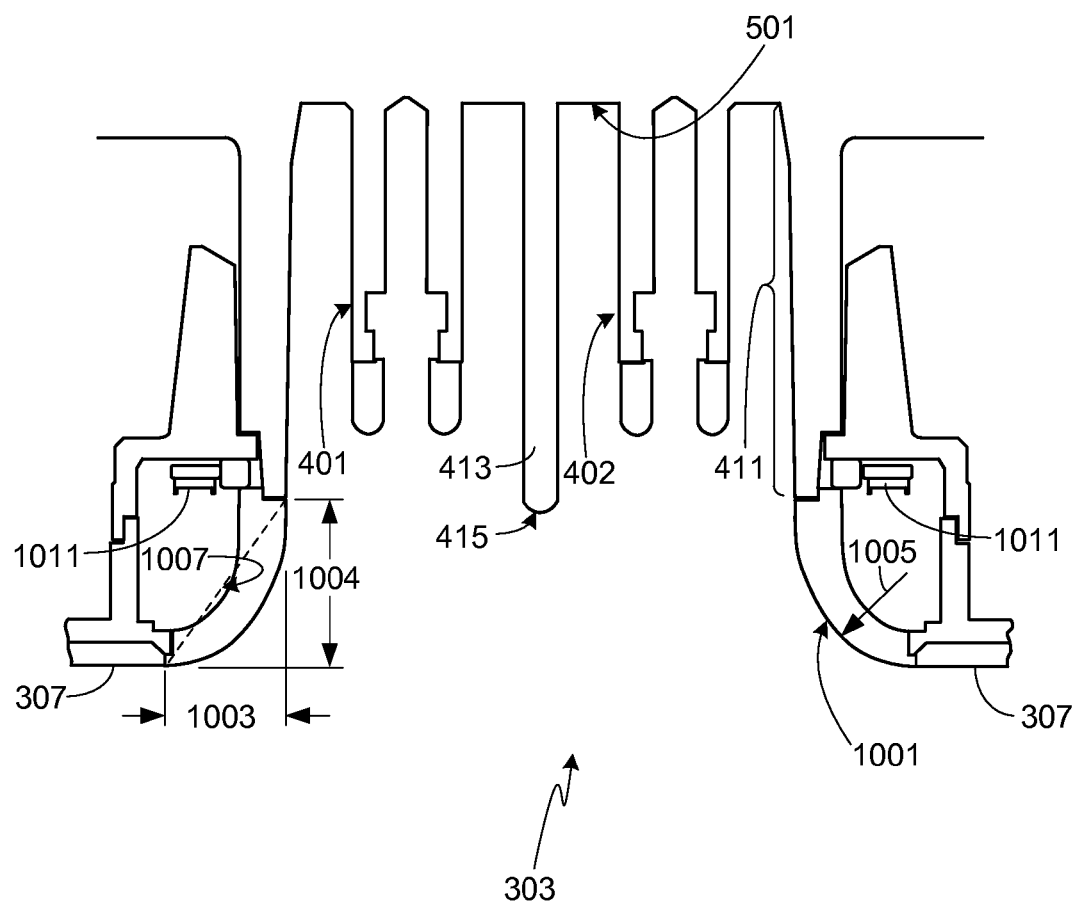
FIG. 10 provides a cross-sectional view of the charge inlet shown in FIGS. 4 and 5.

FIG. 10 provides a cross-sectional view of charge inlet 303 taken along the plane A-A shown in FIG. 5. As shown, connecting inner inlet surface 411 to the substantially planar outer surface 307 of the port assembly is a curved surface 1001, also referred to herein as a funneling surface. Preferably the width 1003 of surface 1001 is at least 2 millimeters wide, more preferably within the range of 2 to 30 millimeters, and still more preferably approximately 10 millimeters wide while the depth 1004 of surface 1001 is at least 2 millimeters deep, more preferably within the range of 2 to 30 millimeters, and still more preferably approximately 16 millimeters deep. It should be understood, however, that both the width 1003 and the depth 1004 of surface 1001 is driven primarily by the placement of inlet 303 within a car, since inlet placement determines in large part the limitations placed on the dimensions of surface 1001. Therefore while the present charge port is designed to minimize space requirements, thus allowing it to be located in a very small area such as lamp assembly 103, other mounting locations would result in different optimized designs for surface 1001.

In the preferred embodiment, the curvature and the width of the cross-section of surface 1001 is the same around the entire perimeter of the charge inlet. In one embodiment, the radius of curvature of surface 1001 is constant between port surface 307 and inlet surface 411. In a preferred embodiment, however, the curvature is tighter near the junction of surfaces 1001 and 307 then it is near the junction of surfaces 1001 and 411. In the illustrated embodiment, curvature 1005, taken near the junction of surfaces 1001 and 307, is greater than 2 millimeters in radius, preferably between 2 and 30 millimeters in radius, more preferably between 4 and 15 millimeters in radius, and yet still more preferably set at approximately 8.5 millimeters in radius. In at least one embodiment, all curvatures corresponding to curvilinear surface 1001 are greater than 8 millimeters in radius. Note that as surface 1001 continues from the juncture of surfaces 1001 and 307 to the juncture with surface 411, the radius of curvature increases, thereby providing a surface that fluidly guides the insertion of connector 600 into inlet 303.

While the curvature of surface 1001 has been optimized for the desired size of the overall port assembly and the selected height and width of surface 1001, it should be understood that surface 1001 may utilize other curvatures and configurations. For example, the ratio of depth 1004 to width 1003 may be decreased, thereby decreasing the radius of curvature as well as the lead-in into inlet surface 411. This, in turn, will provide less of a funneling effect and will instead require that the user be more careful about the initial placement of connector 600 relative to inlet 303. Conversely, if the ratio of depth 1004 to width 1003 is increased, resulting in an extended lead-in and a more gradual curvature to surface 1001, the funneling effect will be much more gradual. Lastly, it should be noted that even a non-curvilinear surface may be used for surface 1001. For example, surface 1001 may be chamfered as illustrated by dashed line 1007. In such a design, surface 1001 would still guide the connector into the inlet, but at the discontinuity between the chamfered surface and surface 411 the user would experience jerky, non-fluid movement of connector 600.

As noted above, in the preferred embodiment the curvature of surface 1001 is optimized for the depth and width of surface 1001 in order to achieve fluid redirection of connector 600 as it is inserted into charge inlet 303. This channeling effect may be further enhanced, as it is in the preferred embodiment, by tapering end section 703 of connector exterior surface 611. Additionally, edge 705 of tapered section 703 may be chamfered, or radiused, thereby further improving upon the funneling effect of inlet 303.

Figure 11:
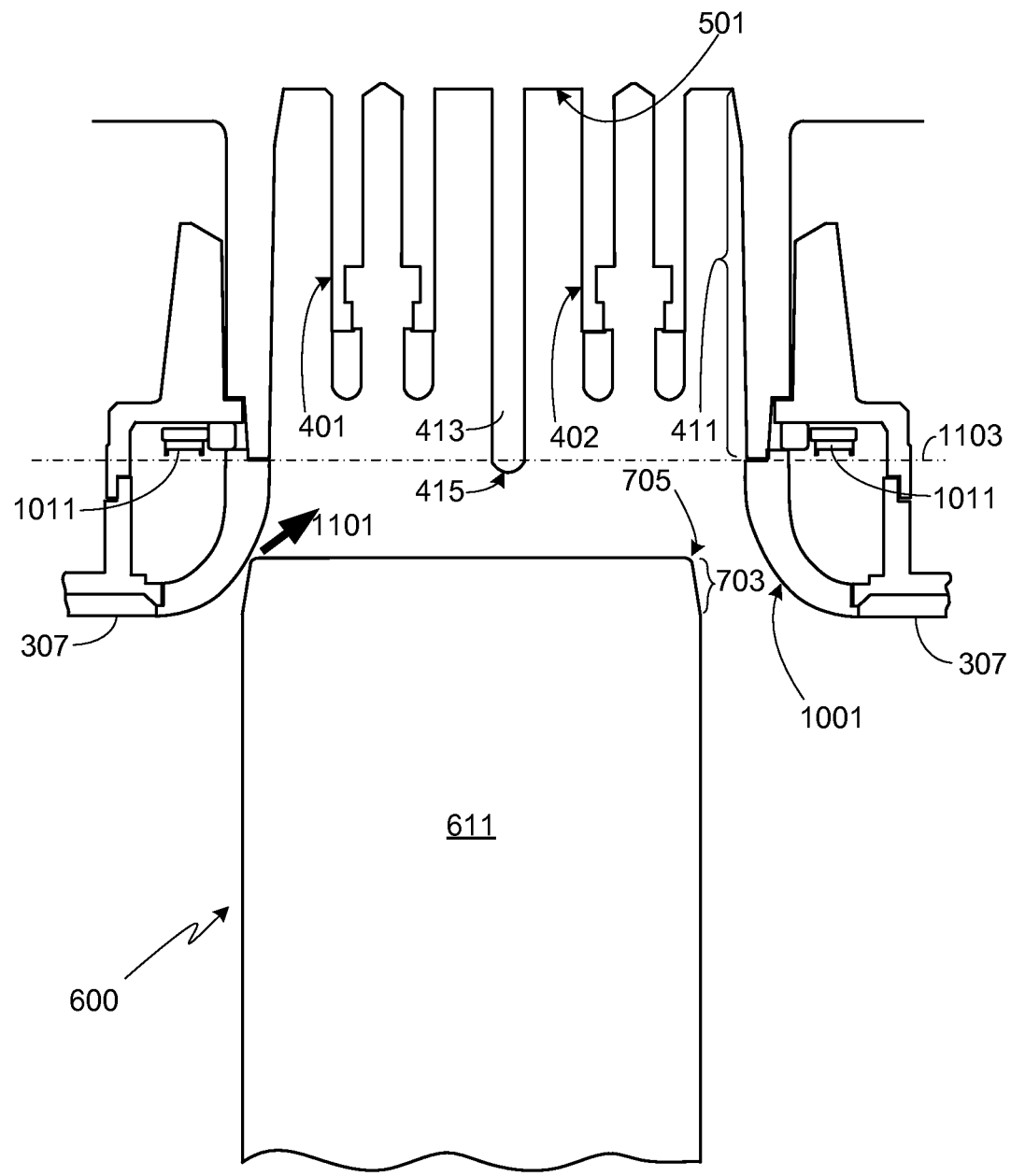
FIG. 11 provides a similar cross-sectional view to that of FIG. 10, with the addition of a charge connector being guided by the inlet's funneling surface.

The ability of the presently disclosed inlet to effectively guide and align the connector during coupling is illustrated in FIG. 11. As shown, when the user attempts to insert connector 600 into inlet 303, the combination of curved surface 1001 and the tapered and radiused end portion of connector 600 cause the connector to be re-directed toward the center of the inlet (illustrated by directional arrow 1101). Additionally, due to the curvilinear shape of surfaces 411, 611 and 1001, each of which approximate a trapezoid, at the same time that surface 1001 is guiding connector 600 toward the center of inlet 303 to achieve axial alignment, it is also rotationally guiding connector 600 in order to achieve rotational alignment.

As shown in the figures, charge inlet 303 also includes a central divider 413 that extends away from innermost surface 501 of the inlet and is configured to fit within a complimentary-shaped, slotted feature 613 of connector 600. Central divider 413 electrically isolates the high current power contacts 401/402 from each other as well as from the other contacts. Additionally, once divider 413 is seated within slot 613 (as a result of connector 600 being inserted into inlet 303), divider 413 helps to support the weight of connector 600, thereby prolonging coupler life by reducing the mechanical load applied to the individual electrical contacts. Preferably and as illustrated, central divider 413, and more particularly the cross-section of central divider 413, is shaped as a three pointed star thus achieving the desired electric contactor isolation.

In the preferred embodiment of the invention, the electrical contacts are recessed relative to port assembly surface 307. Preferably these features are recessed below the junction of curved surface 1001 and inner inlet surface 411 (i.e., plane 1103), thus allowing connector 600 to be axially and rotationally aligned relative to inlet 303 prior to the connector coming into contact with any of the internal charge coupler features. This aspect of the invention is illustrated in FIG. 11 in which connector 600 is shown being guided by surface 1001 toward the center of the inlet. Although not clearly illustrated in this figure, at the same time that surface 1001 is axially aligning connector 600, due to its shape and that of the connector, surface 1001 is also rotationally aligning connector 600 as noted above. Note that in this embodiment the contacts (e.g., 401/402 shown in FIG. 11) are recessed further into inlet 303 than is central divider 413. As a result, the central divider helps to achieve final alignment of connector 600, thus minimizing the mechanical stresses applied to the electrical contacts (e.g., contacts 401/402/403/405/407). To further enhance this alignment feature, preferably the entrance edge 615 of slot 613, and the outer edge 415 of central divider 413, are chamfered or radiused as shown.

In another aspect of the invention, one or more lights 1011 are incorporated into charge inlet 303. Preferably lights 1011 are comprised of light emitting diodes (i.e., LEDs), although other light sources may be used. Lights 1011 may be used to provide illumination on the charge port, thereby helping to guide the insertion of connector 600 into charge port 303. In such a configuration, preferably lights 1011 encircle, or at least partially encircle, inlet 303 and are illuminated when the charge port door 101 is opened. Lights 1011 may also be used to provide charge status, for example indicating (i) if the charging connector (e.g., connector 600) is properly inserted; (ii) if charging has started; (iii) charge rate; (iv) state of charge; (v) charging source capabilities; (vi) if charging has completed; (vii) when a preset target state-of-charge has been reached; and (viii) a malfunction in the charging system. Charge status may be indicated by changing the output color of lights 1011, for example using filters or a multi-color LED or multiple LEDs of different colors. Status may also be indicated by flashing lights 1011, for example using different flash patterns or rates to indicate different conditions. Status may also be indicated by varying the output brightness of lights 1011.

In the illustrated embodiment, lights 1011 are mounted beneath curved surface 1001. Although not shown, a lens or light pipe may be interposed between lights 1011 and surface 1001. Preferably the material comprising surface 1001 is opaque when lights 1011 are off, but transparent to the wavelength(s) of light output by lights 1011. As a result, the output from lights 1011 is clearly visible while the various structures underlying surface 1001 are not.

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A vehicle charge inlet integrated into a port assembly surface, the vehicle charge inlet comprising:
    a plurality of electrical contacts configured to be electrically coupled to a second plurality of electrical contacts integrated into a charge connector, said plurality of electrical contacts comprising a first power contact, a second power contact, a ground contact, a pilot contact, and a proximity sense contact;
    an inlet housing having an inlet surface, a first end and a second end, wherein said first end is closed by a bottom surface and said second end is open and sized to accept said charge connector, wherein said plurality of electrical contacts are integrated into said bottom surface of said inlet housing, wherein a perimeter of said inlet surface is curvilinear and non-cylindrical, wherein a second perimeter corresponding to said charge connector is complementary to said perimeter of said inlet surface and sized to allow insertion of said charge connector into said inlet housing, and wherein said perimeter of said inlet surface and said second perimeter of said charge connector permit only a single orientation of said charge connector upon insertion of said charge connector into said vehicle charge inlet, wherein said single orientation aligns said charge connector to said vehicle charge inlet and aligns said plurality of electrical contacts to said second plurality of electrical contacts;
    a divider extending from said bottom surface and configured to fit within a complementary slot of said charge connector, said divider fabricated from an electrically insulating material, wherein said divider is separate from said plurality of electrical contacts; and
    a latching mechanism integrated within said inlet housing, wherein said latching mechanism is comprised of a pawl configured to pass through said inlet surface and fit within a slot in said charge connector when said charge connector is inserted into said vehicle charge inlet during vehicle charging.

2. The vehicle charge inlet of claim 1, wherein all curvatures comprising said perimeter of said inlet surface have a radius of curvature of at least 2 millimeters.

3. The vehicle charge inlet of claim 1, wherein all curvatures comprising said perimeter of said inlet surface have a radius of curvature of at least 6 millimeters.

4. The vehicle charge inlet of claim 1, wherein a shape corresponding to said perimeter of said inlet surface approximates a trapezoidal shape.

5. The vehicle charge inlet of claim 1, wherein said inlet surface of said inlet housing is continuous and does not incorporate an alignment key or key slot.

6. The vehicle charge inlet of claim 1, further comprising a funneling surface, wherein said funneling surface connects said open end of said inlet housing to said port assembly surface, and wherein said funneling surface extends said curvilinear and non-cylindrical shape of said perimeter of said inlet surface to said port assembly surface.

7. The vehicle charge inlet of claim 6, wherein a width of said funneling surface is between 2 and 30 millimeters, and wherein a depth of said funneling surface is between 2 and 30 millimeters.

8. The vehicle charge inlet of claim 6, wherein a cross-section corresponding to said funneling surface maintains a constant curvilinear shape around said perimeter of said inlet surface.

9. The vehicle charge inlet of claim 6, wherein a radius of curvature corresponding to said funneling surface is constant between said open end of said inlet housing and said port assembly surface.

10. The vehicle charge inlet of claim 6, wherein a cross-section corresponding to said funneling surface is curvilinear with all curvatures corresponding to said curvilinear funnel surface being greater than 2 millimeters in radius.

11. The vehicle charge inlet of claim 6, wherein a curvature corresponding to a cross-section of said funneling surface at the juncture of said funneling surface and said port assembly surface is between 2 and 30 millimeters in radius.

12. The vehicle charge inlet of claim 6, wherein a curvature corresponding to a cross-section of said funneling surface at the juncture of said funneling surface and said port assembly surface is between 4 and 15 millimeters in radius.

13. The vehicle charge inlet of claim 6, wherein a shape corresponding to said funneling surface approximates a trapezoidal shape.

14. The vehicle charge inlet of claim 6, further comprising a plurality of lights mounted beneath said funneling surface.

15. The vehicle charge inlet of claim 14, wherein said plurality of lights are comprised of a plurality of light emitting diodes.

16. The vehicle charge inlet of claim 14, wherein said plurality of lights are not visible beneath said funneling surface when said plurality of lights are off, and wherein output light generated by said plurality of lights is visible through said funneling surface.

17. The vehicle charge inlet of claim 14, wherein activation of said plurality of lights provides charge status information.

18. The vehicle charge inlet of claim 1, wherein said divider has a three pointed star shape.

19. The vehicle charge inlet of claim 1, wherein a first portion of said divider extends between said first and second power contacts, wherein a second portion of said divider extends between said first power contact and said pilot contact, and wherein a third portion of said divider extends between said second power contact and said proximity sense contact.

* * * * *